INVENTOR
B. K. KINARIWALA
BY
Ralph J. Holcomb
ATTORNEY

Sept. 19, 1961 B. K. KINARIWALA 3,001,156

ACTIVE IMPEDANCE BRANCH

Filed Dec. 1, 1958

2 Sheets-Sheet 2

INVENTOR
B. K. KINARIWALA
BY
Ralph T. Holcomb
ATTORNEY 3,001,156
Patented Sept. 19, 1961

3,001,156

ACTIVE IMPEDANCE BRANCH

Bharat K. Kinariwala, Bedminster, N.J., assignor to Bell Telephone Laboratories, Incorporated, New York, N.Y., a corporation of New York Filed Dec. 1, 1958, Ser. No. 777,402
6 Claims. (Cl. 333—80)

This invention relates to wave transmission networks and more particularly to an active impedance branch for use in such networks.

The principal object of the invention is to eliminate inductors, and also transformers, in a two-terminal impedance branch without restricting the impedance characteristic obtainable. A related object is to increase the quality factor in an impedance branch of this type.

Wave transmission networks often operate at frequencies so low or so high that it is difficult to provide satisfactory inductors for use as component parts thereof. The inductors may be too large physically or too expensive, or there may be too much stray capacitance associated with them. Therefore, it is desirable to eliminate inductors in the impedance branches from which the network is constructed. It is also desirable to eliminate transformers.

The present invention provides a two-terminal impedance branch which requires no inductors but which has an unrestricted driving-point impedance with both zeroes and poles at any desired points in the complex frequency plane. The branch comprises a passive network having at least three ports and a two-port active network. If the passive network has only three ports, it is made up of resistors and capacitors, which may be formed into simple structures, and generally one or more transformers. The transformers may be eliminated in every instance by increasing the number of ports in the passive network to more than three and terminating the added ports in properly chosen capacitors. In this case, the passive network will comprise only resistors interconnecting each port with each of the other ports. The active network may be simply an amplifier. If three ports of the passive network are designated 1, 2, and 3, the active network is connected between ports 1 and 2. If the impedance is $Z_3$ at port 3 when the gain of the active network is zero, the zeroes of $Z_3$ correspond to the poles of the transfer function between ports 1 and 2 when port 3 is short-circuited, and the poles of $Z_3$ correspond to the poles of the transfer function between ports 1 and 2 when port 3 is open-circuited, then the unrestricted impedance appears at port 3.

The nature of the invention and its various objects, features, and advantages will appear more fully in the following detailed description of the typical embodiments illustrated in the accompanying drawing, of which FIG. 1 is a block diagram of an active impedance branch in accordance with the invention using a three-port, passive, R-C network;

Figure 1:
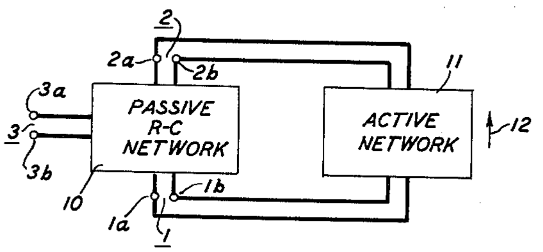

The impedance branch of FIG. 1 comprises a three-port passive network 10 and a two-port active network 11. The passive network 10 requires no inductors. It is of the type called an R-C network since it is made up of resistors and capacitors and, in general, one or more transformers. The network 10 has three pairs of terminals *1a—1b*, *2a—2b*, and *3a—3b* which constitute the three ports designated 1, 2, and 3. The network 11, connected between ports 1 and 2, transmits only in the direction of the arrow 12 and may be simply an amplifier. An unrestricted driving-point impedance Z appears at the port 3.

The impedance Z is given by the expression $$Z=Z_3\left[\frac{1-\mu T_1}{1-\mu T_2}\right] \quad (1)$$

where $Z_3$ is the impedance at port 3 when the active network 11 is placed in a reference condition of zero transmission in the direction of the arrow 12, $\mu$ is the gain of the network 11, and $T_1$ and $T_2$ are the transfer functions of the network 10 from port 1 to port 2 when port 3 is short-circuited and open-circuited respectively. Since an R-C network such as 10 can have transmission zeroes anywhere in the complex frequency plane, both $T_1$ and $T_2$ can have any desired zeroes. Furthermore, the poles of $T_1$ correspond to the zeroes of $Z_3$ and the poles of $T_2$ correspond to the poles of $Z_3$. Therefore, Z can have both zeroes and poles at any desired points in the complex frequency plane.

It will now be shown that, for any given driving point impedance Z, it is possible to determine an impedance $Z_3$ and transfer functions $T_1$ and $T_2$ which represent a physically realizable passive R-C network 10. For convenience, it will be assumed that the active network 11 has a gain of unity ($\mu=1$) and input and output impedances each equal to one ohm pure resistance. If the gain and impedances have other values, the element values of the network 10 are merely rescaled accordingly.

Each of the parameters Z, $T_1$ and $T_2$ may be expressed as a rational function of the frequency *f*. However, the analysis is simplified by the introduction of the parameter *p*, called the complex frequency and defined as $$p=\delta+j\omega \quad (2)$$

where $\delta$ is the real part, $j\omega$ is the imaginary part, and $\omega$ is the radian frequency $2\pi f$. If $$Z=N/D \quad (3)$$

$$T_1=P/Q \quad (4)$$

$$T_2=R/S \quad (5)$$

then $$Z_3=Q/S \quad (6)$$

and, substituting in (1), $$Z=\frac{Q}{S}\,\frac{1-P/Q}{1-R/S}=\frac{Q-P}{S-R} \quad (7)$$

where N, D, P, Q, R, and S are polynomials in *p*, and Q and S have only negative real roots. When N and D are given, it is quite easy to determine P, Q, R, and S. It can be shown that P, Q, R, and S have only negative real roots.

The transfer function $T_3$ between ports 1 and 2 when port 3 is terminated in a resistor of one ohm is given by $$T_3=\frac{T_2+T_1Z_3}{Z_3+1} \quad (8)$$

Substituting from (4), (5), and (6) gives $$T_3=\frac{R/S+(P/Q)(Q/S)}{Q/S+1}=\frac{P+R}{Q+S} \quad (9)$$

It is obvious from (8) that $T_3$ refers to a physical R-C network if $Z_3$ is an R-C impedance. In order to ensure that $Z_3$ is an R-C impedance, Q and S must be properly chosen. As seen from (7), there is complete freedom in the choice of Q and S.

The network 10 may be determined by a scattering matrix made up of nine scattering parameters. Two of these parameters are determined by $T_1$ and $Z_3$. The other elements of the matrix are chosen arbitrarily so as to give a physically realizable scattering matrix. Synthesis of the three-port network from this matrix is then carried out by any one of several known ways. An appropriate one is described by W. Cauer in his book entitled "Theorie der linearen Wechselstromschaltungen," published by Becker und Erler in Leipzig in 1941.

Figure 2:
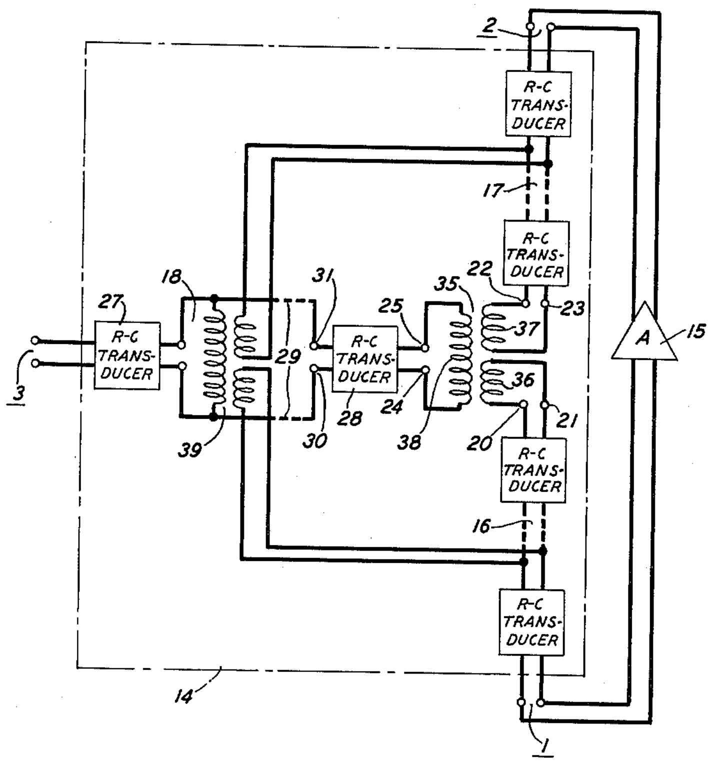
FIG. 2 is a circuit showing one embodiment of the branch of FIG. 1 in greater detail.

FIG. 2 shows a typical embodiment of the impedance branch of FIG. 1 when the network 10 is synthesized in accordance with the Cauer method. In FIG. 2, the portion enclosed in the broken-line box 14 corresponds to the passive three-port network 10 in FIG. 1. The ports 1, 2, and 3 are given the same designations in both figures. The amplifier 15, connected between ports 1 and 2, corresponds to the active two-port network 11.

Figure 3:
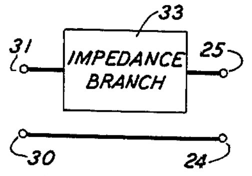
FIGS. 3 and 4 show alternative arrangements of the two-port R-C transducers used in the partial networks of FIG. 2.
Figure 4:
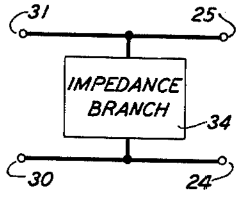
Figure 5:
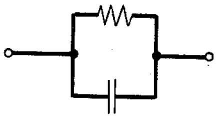
FIGS. 5 and 6 show arrangements of resistors and capacitors which may be used in the impedance branches of FIGS. 3 and 4.
Figure 6:
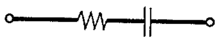

The network 14 comprises three partial networks 16, 17, and 18. The partial network 16 extends between port 1 and the terminals 20—21, network 17 between port 2 and the terminals 22—23, and network 18 between port 3 and the terminals 24—25. Each of the partial networks is made up of a number of two-port, R-C transducers connected in tandem. In the partial network 18, for example, two R-C transducers 27 and 28 are shown. Others may be included, as indicated by the broken lines 29. Each of the R-C transducers such as 28, between the terminals 24—25 and 30—31, may comprise a series impedance branch 33, as shown in FIG. 3, a shunt impedance branch 34, as shown in FIG. 4, or combinations of these branches. Each of the branches 33 and 34 may comprise a resistor and a capacitor connected in parallel, as shown in FIG. 5, or in series, as shown in FIG. 6. In either of these branches, one of the elements may, in some cases, be omitted.

At their inner ends, the partial networks 16, 17, and 18 are connected together through a transformer 35 having three inductively coupled windings 36, 37, and 38. Also, at one or more intermediate points, the partial networks may be coupled by additional transformers such as 39. If impedance transformation is not required at any particular point, the transformer coupling may be replaced by a direct connection between the partial networks.

Figure 7:
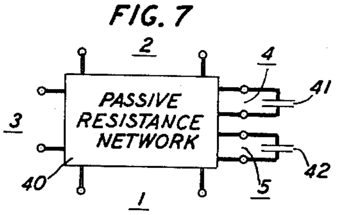
FIG. 7 shows an alternative passive network of resistors with five ports and two terminating capacitors.

In a second embodiment of the invention, all transformers may be eliminated from the passive R-C network 10. This is done by increasing the number of ports to more than three and terminating the additional ports in capacitors. For example, FIG. 7 shows a network 40 with five ports in which the ports 4 and 5 are terminated in the capacitors 41 and 42, respectively. The active network 11 is connected between the ports 1 and 2, as shown in FIG. 1, and the unrestricted impedance appears at the port 3.

Figure 8:
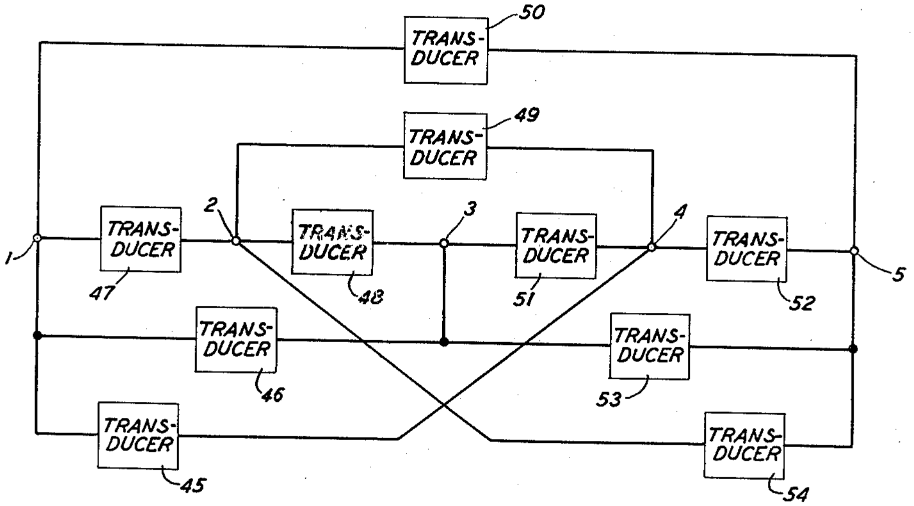
FIG. 8 is a block diagram showing the structure of the five-port network for the general case.

It can be shown that, in the general case, the network 40 will have the configuration shown in FIG. 8. This is a single-line, block diagram in which each of the circles 1 to 5 represents a port with two terminals, each of the blocks 45 to 54 represents a two-port transducer comprising resistors only, and each line connecting a port to a transducer represents a two-wire transmission path. It is seen that transducers connect each of the ports 1 to 5 with each of the other ports. For the five-port case, it can be shown that the transducer 52 interconnecting ports 4 and 5 will have infinite loss and may be omitted. For this case, then, transducers will only be required to interconnect each of the ports 1, 2, and 3 with each other and with each of the additional ports 4 and 5, respectively.

Figure 9:
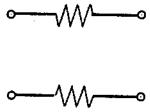
FIGS. 9 and 10 are schematic circuits of two forms of transducers suitable for use in one embodiment of the network of FIG. 8.
Figure 10:
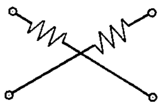

Each of the transducers 45 to 54 comprises two resistors connected directly between corresponding terminals, as shown in FIG. 9, or diagonally, as shown in FIG. 10. Thus, it is seen that the network 40 comprises only internal resistors and the terminating capacitors 41 and 42. No transformers are required.

Figure 11:
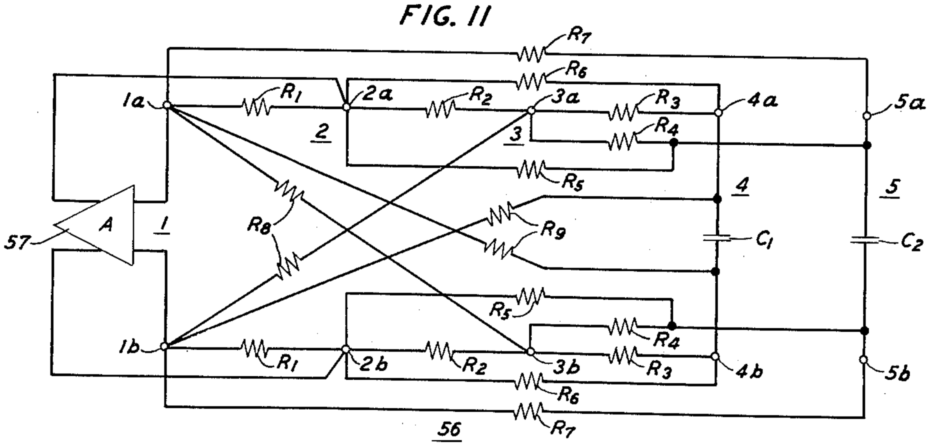
FIG. 11 is a schematic circuit of an example of an impedance branch in accordance with the invention using a five-port resistance network of the type shown in FIG. 8.

FIG. 11 is a schematic circuit of a typical two-terminal R–C impedance branch in accordance with this second embodiment. The passive network 56 has five pairs of terminals designated, respectively, *1a—1b*, *2a—2b*, *3a—3b*, *4a—4b*, and *5a—5b*, which constitute five ports numbered 1 to 5. The desired unrestricted impedance Z appears between the terminals *3a* and *3b*. The amplifier 57, connected between the ports 1 and 2, has input and output impedances which are substantially zero and thus the amplifier constitutes a current-controlled voltage source. This type of amplifier may be obtained by employing a large shunt feedback. The capacitors $C_1$ and $C_2$ terminating the ports 4 and 5 correspond to the capacitors 41 and 42 in FIG. 7.

The passive network 56 is a symmetrical structure made up only of the pairs of resistors $R_1$, $R_1$ through $R_9$, $R_9$ which interconnect each of the ports 1, 2, and 3 with each other and with each of the other ports 4 and 5. The resistors $R_1$ through $R_7$ are connected directly, as shown in FIG. 9, and the resistors $R_8$ and $R_9$ diagonally, as shown in FIG. 10. Thus, one resistor $R_1$ is connected between the terminals *1a* and *2a*, and the other resistor $R_1$ between *1b* and *2b*. But one resistor $R_8$ interconnects *1a* and *3b* and the other resistor $R_8$ interconnects *1b* and *3a*. It will be noted that no resistors directly connect the ports 4 and 5. In this example, the expression for the impedance is $$Z=1{,}122\left[\frac{p^2+2.25\times10^{10}}{p^2+2\times10^3p+3\times10^{10}}\right] \quad (10)$$

The resistances of the resistors in ohms and the capacitances of the capacitors in micromicrofarads are as follows:

| | |
|---|---|
| $R_1$=23,809 | $R_7$=5,635 |
| $R_2$=7,510 | $R_8$=25,556 |
| $R_3$=3,611 | $R_9$=5,732 |
| $R_4$=1,444 | $C_1$=1,007 |
| $R_5$=7,232 | $C_2$=1,260 |
| $R_6$=19,098 | |

It is to be understood that the above-described arrangements are only illustrative of the application of the principles of the invention. Numerous other arrangements may be devised by those skilled in the art without departing from the spirit and scope of the invention.

What is claimed is:

1. A two-terminal impedance branch of unrestricted impedance comprising a passive network, an active network, and a capacitor, the passive network having four ports and including only resistors interconnecting each port with each of the other ports, respectively, the capacitor terminating one of the ports, and the active network being connected between two of the other ports.

2. A two-terminal impedance branch of unrestricted impedance comprising a passive network having three ports and at least one additional port, capacitors equal in number to the number of additional ports, and an active network, the passive network including only resistors interconnecting each of the three ports with each other and with each of the additional ports, the capacitors terminating the additional ports, and the active network being connected between two of the three first-mentioned ports.

3. In combination, a passive network and an active network, the passive network comprising only one type of reactor and having three ports designated 1, 2, and 3, the the active network being connected between ports 1 and 2 and the impedance at port 3 being unrestricted and equal to $Z_3(1-\mu T_1)/(1-\mu T_2)$, where $Z_3$ is the impedance at port 3 when the active network is placed in a reference condition of zero transmission from port 1 to port 2, $\mu$ is the gain of the active network, and $T_1$ and $T_2$ are the respective transfer functions of the passive network from port 1 to port 2 when port 3 is short-circuited and open-circuited, respectively.

4. The combination in accordance with claim 3 in which the passive network comprises three partial networks extending between a common point and each of the network ports, respectively, and the partial networks are coupled together at the common point.

5. The combination in accordance with claim 4 in which the partial networks are also coupled together at intermediate points.

6. An impedance branch comprising a passive network and an amplifier, the passive network including capacitors as the only type of reactor and having three ports designated 1, 2, and 3, the amplifier being connected between ports 1 and 2 and the impedance at port 3 being unrestricted and equal to $Z_3(1-\mu T_1)/(1-\mu T_2)$, where $Z_3$ is the impedance at port 3 when $\mu$, the gain of the amplifier, is zero, and $T_1$ and $T_2$ are the respective transfer functions of the passive network from port 1 to port 2 when port 3 is short-circuited and open-circuited, respectively.

References Cited in the file of this patent

UNITED STATES PATENTS

| | | |
|---|---|---|
| 2,549,065 | Dietzold | Apr. 17, 1951 |
| 2,817,822 | Meyers | Dec. 24, 1957 |